(12) United States Patent
Cunha et al.

(10) Patent No.: US 7,371,049 B2
(45) Date of Patent: *May 13, 2008

(54) MANUFACTURABLE AND INSPECTABLE MICROCIRCUIT COOLING FOR BLADES

(75) Inventors: Frank Cunha, Avon, CT (US); Om Parkash Sharma, South Windsor, CT (US); Edward F. Pietraszkiewicz, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 304 days.

This patent is subject to a terminal disclaimer.

(21) Appl. No.: 11/217,560

(22) Filed: Aug. 31, 2005

(65) Prior Publication Data

US 2007/0048134 A1    Mar. 1, 2007

(51) Int. Cl.
*F01D 5/18* (2006.01)
(52) U.S. Cl. ............... 416/97 A; 416/232; 29/889.721; 29/889.7
(58) Field of Classification Search ............... 415/95, 415/96 R, 97 A, 96 A, 231 R, 232, 233; 29/889, 889.22, 889.7, 889.72, 889.721, 29/889.722
See application file for complete search history.

(56) References Cited

U.S. PATENT DOCUMENTS 5,392,515 A * 2/1995 Auxier et al. .......... 29/889.721

\* cited by examiner

*Primary Examiner*—Edward K. Look
*Assistant Examiner*—Dwayne J White
(74) *Attorney, Agent, or Firm*—Bachman & LaPointe

(57) ABSTRACT

A method for manufacturing a turbine engine component comprises the steps of forming a first half of an airfoil portion of the turbine engine component and forming a plurality of microcircuits having at least one passageway on an exposed internal wall of the first half of the airfoil portion. The method further comprises forming a second half of the airfoil portion of said turbine engine component, and forming at least one additional cooling microcircuit having at least one passageway on an exposed internal wall of the second half of the airfoil portion. Thereafter, the first half is placed in an abutting relationship with the second half after the cooling microcircuits have been formed and inspected. The first half and the second half are joined together to form the airfoil portion.

28 Claims, 3 Drawing Sheets

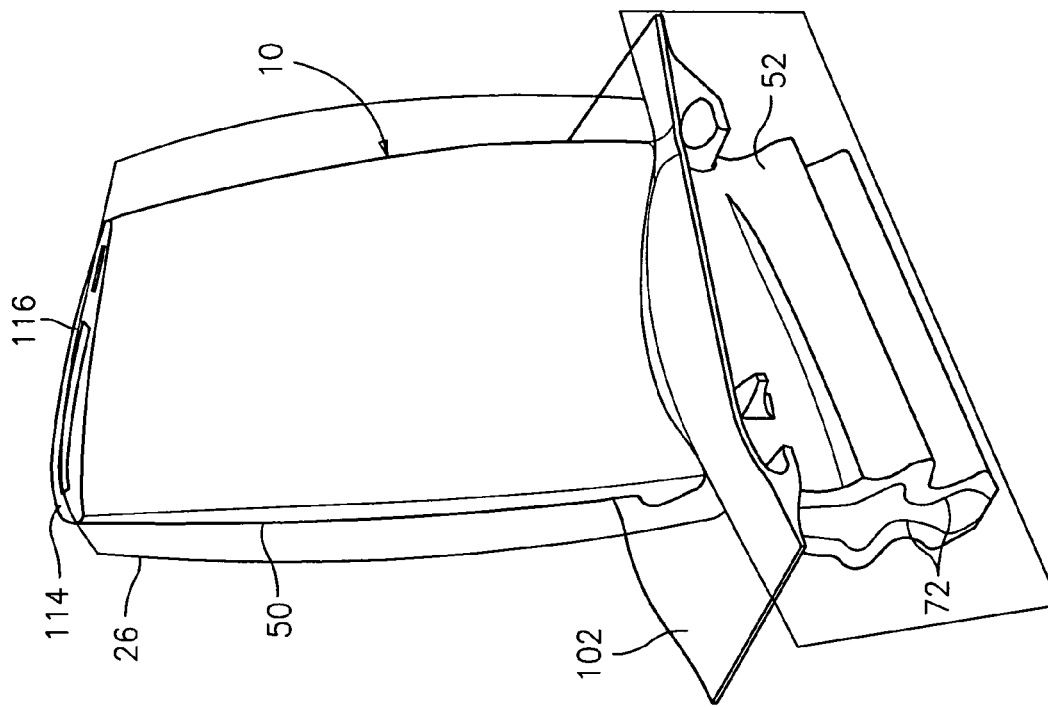
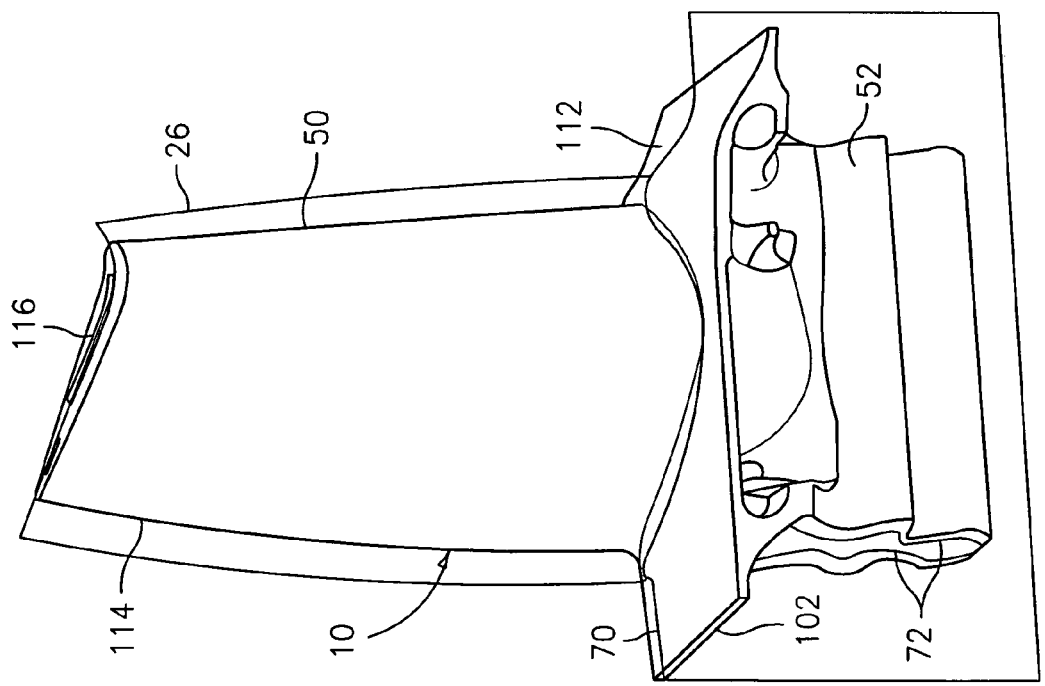
FIG. 4A
FIG. 4B

MANUFACTURABLE AND INSPECTABLE MICROCIRCUIT COOLING FOR BLADES

BACKGROUND OF THE INVENTION (1) Field of the Invention

The present invention relates to a method for manufacturing turbine engine components having an airfoil portion with a plurality of cooling microcircuits and a turbine engine component formed thereby.

(2) Prior Art

Turbine engine components, such as high pressure turbine blade airfoils, encounter harsh environments and are subject to extremely hot gases from other components such as burners. The airfoil portions of these components experience a varying thermal load. As a result, the airfoil portions need to be cooled locally. The mechanisms for cooling the airfoil portions vary from design to design but there is a certain optimum arrangement that minimizes cooling flow.

Today, cooling microcircuits in the airfoil portions of turbine engine components may be formed using refractory metal cores in a double wall design. The refractory metal core material has an elevated melting temperature, making it desirable for processing during investment casting before being leached-out and forming internal microcircuit passageways within a wall of the cast component. While this technique is effective to form very desirable cooling microcircuits, it is difficult to inspect the microcircuits thus formed because the cooling microcircuits are formed within the walls of the airfoil portion.

SUMMARY OF THE INVENTION

Accordingly, one aim of the present invention is to provide a method for forming a turbine engine component having an airfoil portion with cooling microcircuits that can be inspected without great difficulty In accordance with the present invention, a method for manufacturing a turbine engine component having an airfoil portion is provided. The method broadly comprises the steps of forming a first half of an airfoil portion of the turbine engine component and forming a plurality of cooling microcircuits having at least one passageway on an exposed internal wall surface of the first half of the airfoil portion. The method further comprises forming a second half of the airfoil portion of the turbine engine component, forming at least one additional cooling microcircuit having at least one passageway on an exposed internal wall surface of the second half of the airfoil portion, and placing the first half in an abutting relationship with the second half after the microcircuits have been formed and inspected.

The method of the present invention is quite advantageous in that an airfoil portion for a turbine engine component, such as a high pressure turbine blade, can be easily manufactured with microcircuit type cooling features that can be easily inspected.

Further, in accordance with the present invention, a turbine engine component broadly comprises an airfoil portion having a first airfoil half and a second airfoil half in an abutting relationship, and each of said first airfoil half and said second airfoil half having a plurality of cooling microcircuit features on an internal wall surface.

Other details of the manufacturable and inspectable microcircuit cooling for blades of the present invention, as well as other objects and advantages attendant thereto, are set forth in the following detailed description and the accompanying drawings wherein like reference numerals depict like elements.

BRIEF DESCRIPTION OF THE DRAWINGS

FIGS. 4A and 4B illustrate a turbine engine component formed in accordance with the present invention and the split lines for the various portions of the component.

DETAILED DESCRIPTION OF THE PREFERRED EMBODIMENT(S)

Figure 1:
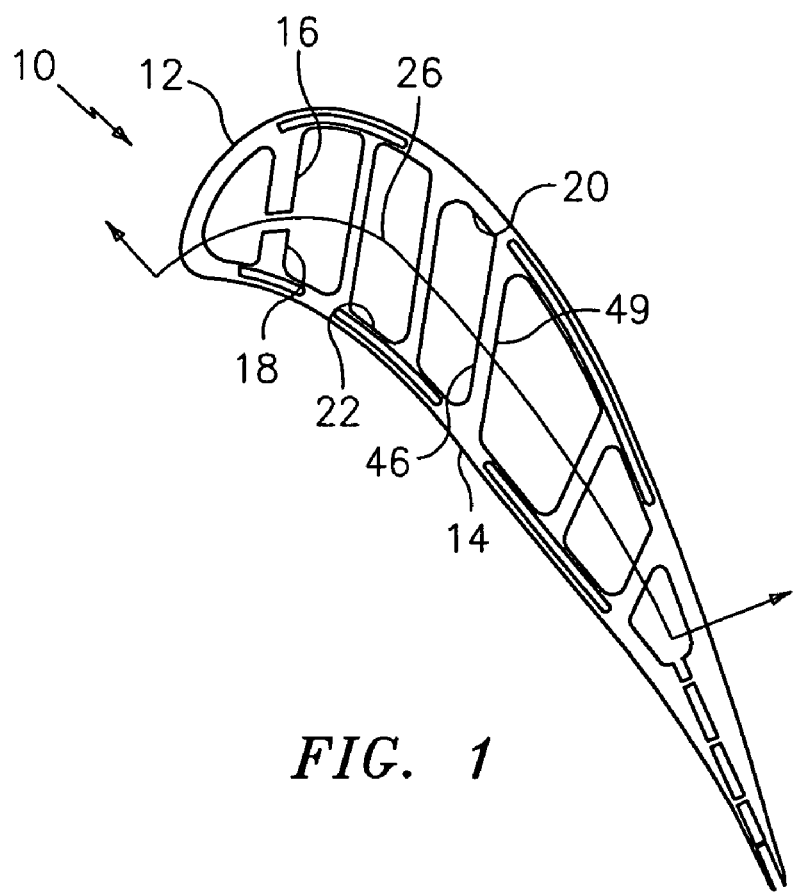
FIG. 1 illustrates an airfoil portion of a turbine engine component having a first airfoil half formed in accordance with the present invention.

Referring now to the drawings, FIG. 1 illustrates a first airfoil half 12 of an airfoil portion 10 of a turbine engine component, such as a high pressure turbine blade or a vane. The airfoil portion 10 has a second half 14 such as that shown in FIG. 3. The airfoil halves 12 and 14 may have any desired shape and may include internal structures, such as ribs 16 and 18. As will be discussed hereinafter, the airfoil halves 12 and 14 are formed so that respective internal wall surfaces 20 and 22 are exposed. When joined together the airfoil halves 12 and 14 form the airfoil portion 10 of a turbine engine component 50 such as that shown in FIGS. 4A and 4B.

The airfoil halves 12 and 14 may be cast in any suitable manner known in the art from any suitable material known in the art. For example, the airfoil halves 12 and 14 may be formed from a nickel-based, cobalt-based, iron-based, or titanium-based alloy material.

Figure 5:
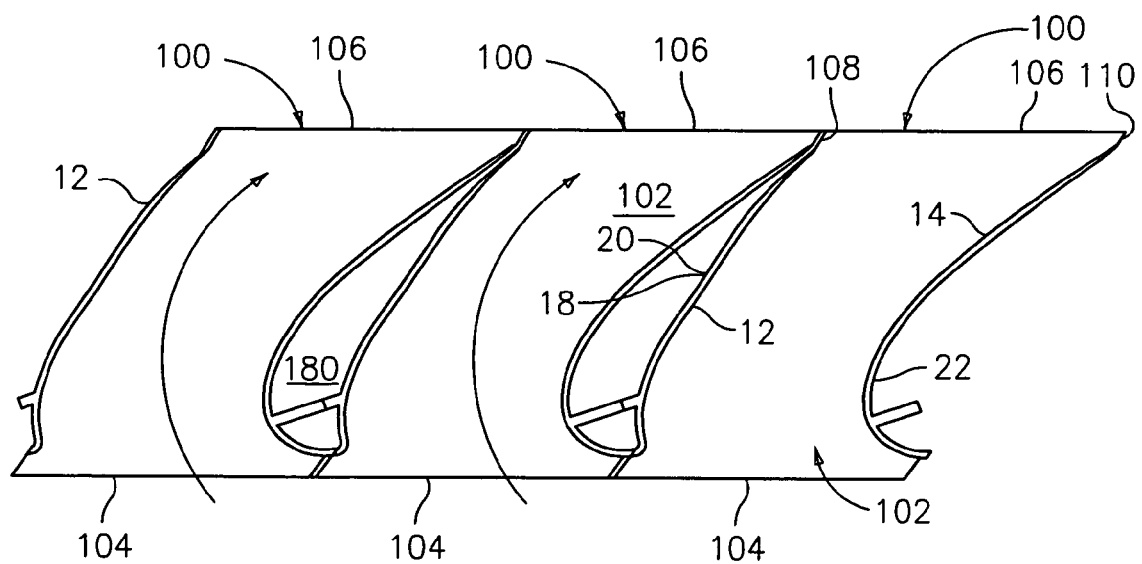
FIG. 5 illustrates a structure from which the turbine engine component can be assembled.

In a preferred embodiment of the present invention, the airfoil halves 12 and 14 may be formed from a structure 100, such as that shown in FIG. 5, from which the turbine engine component 50 can be formed. The structure 100 may include a platform 102 having a leading edge 104, a trailing edge 106, a first side edge 108, and a second side edge 110. The structure 100 also may include the first airfoil half 12 along the edge 108 and the second airfoil half 14 along the edge 110. The structure 100 may also have features such as an attachment portion 52 formed on an underside of the platform 102 and fillets 112 formed between an exterior surface 114 or 116 of a respective one of the airfoil halves 12 and 14 and a surface of the platform 102. One of the advantages to the structure 100 is that the internal wall surfaces 20 and 22 are exposed prior to the halves 12 and 14 of adjacent ones of the structures 100 being joined together. Because the internal wall surfaces 20 and 22 are exposed, one or more cooling microcircuits can be easily formed on the internal wall surfaces 20 and 22. The shape and number of the microcircuits can be selected to optimize the cooling needs of the airfoil portion 10 in its intended environment.

FIG. 1 illustrates one form of a split line 26 which can be used in the casting units 24 in carrying out the present invention to form the airfoil halves 12 and 14. The split line 26 is preferably formed along a low stress line of the airfoil portion.

Figure 2:
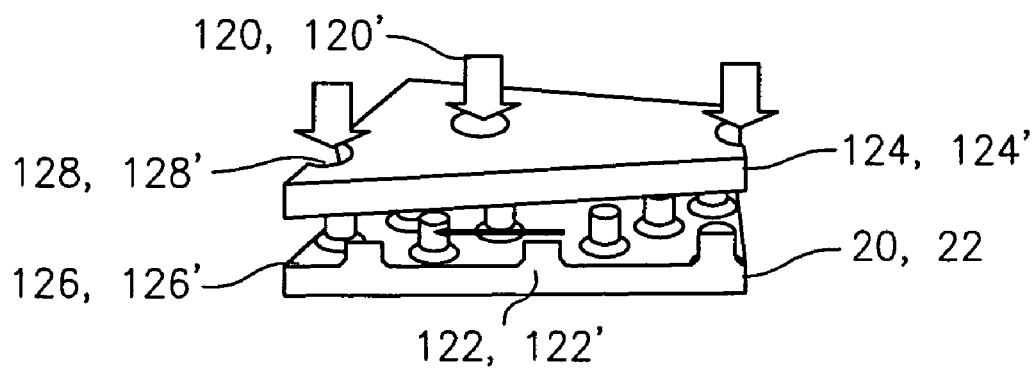
FIG. 2 illustrates a cooling microcircuit which can be installed in the airfoil half of FIG. 1 in a plurality of locations.

Referring now to FIGS. 1 and 2, one or more cooling microcircuits 120 can be formed on the internal wall surface 20 of the airfoil half 12 using any suitable technique known in the art. For example, each microcircuit 120 can be a cast structure if desired where a number of elements or internal features 122, such as pedestal structures, which define one or more passageways for a cooling fluid, as well as an inlet 124 and an outlet 126 for the passageway(s), are cast. Alternatively, each microcircuit 120 can be machined, using any suitable technique known in the art, to form the elements or internal features 122 which define the passageway(s) for the cooling fluid and the inlet 124 and the outlet 126 for the passageway(s). In another alternative approach, the internal features or elements 122 can be formed using metal matrix composites using plasma spraying thickness build-up with pre-alloyed powder followed by surface finish control or by a combination of hot working, surface grinding and chemical milling to final thickness.

As noted above, the exact configuration of the microcircuit 120 is a function of the end use of the turbine engine component. An advantage to forming the microcircuit 120 in this manner is that it can be easily inspected prior to assembly of the airfoil portion 10. Still another advantage is that the total exposure of the internal wall permits a search of an optimum cooling arrangement in terms of durability and manufacturing.

After or before, each microcircuit 120 has been inspected, a cover plate 128 may be placed over each microcircuit 120 and joined to one or more of the elements 122.

Figure 3:
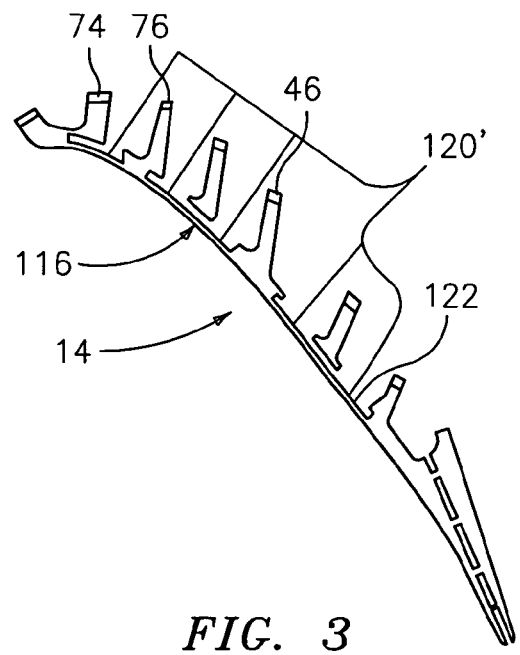
FIG. 3 illustrates a second airfoil half formed in accordance with the present invention and the sites for cooling microcircuits.

In a similar fashion, as shown in FIGS. 1 and 3, one or more additional microcircuits 120' may be formed on the internal wall surface 22 of the airfoil half 14. As with the first microcircuit 120, each additional microcircuit 120' may be formed using any suitable technique known in the art, such as those discussed hereinbefore, and may have any number of cooling passageways. Each microcircuit 120' also may have a plurality of elements or internal features 122' defining one or more passageways for the cooling fluid, and an inlet 124' and an outlet 126' for the cooling fluid passageway(s). After or before each additional microcircuit 120' has been inspected, a cover plate 128' may be placed over the respective microcircuit 120' and joined to the elements 122'.

The cover plates 128 and 128' may be joined to the elements 122 and 122' of the respective microcircuits 120 and 120' using any suitable technique known in the art such as brazing, diffusion bonding, and welding. Preferably, the cover plates 128 and 128' are joined to the respective microcircuits 120 and 120' using a solid state bonding technique. When brazing is used, an interlayer material is applied to the parts to be joined together. The interlayer material melts at the brazing temperature, and the resultant liquid wets and fills the interface between the two mating surfaces which are to be joined. The parts being joined are kept at the brazing temperature only for a time sufficient to insure complete melting and spreading of the brazing filler metal. The assembly is subsequently cooled to solidify the filler metal resulting in a joint that has a composition which differs considerably from the base metal. If needed, the quality of the brazed joint can be improved by a post-braze diffusion heat treatment.

It should be noted that one advantage to this approach for forming the cooling microcircuits is that the cover plates 128 and 128' can easily be replaced if dirt plugging becomes a problem in the field.

After the microcircuits 120 and 120' have been formed and inspected and the cover plates 128 and 128' have been installed, the structures 100 are ready to be installed in a support structure (not shown) such as a disk. Adjacent ones of the structures 100 form an airfoil portion 10 by placing the airfoil half 12 in an abutting relationship with the second airfoil half 14 wherein mating surfaces 40 on the airfoil half 12 contact or abut mating surfaces 46 on the airfoil half 14.

The structures 100 forming the turbine engine component 50 may be joined together along the split lines 26. While any suitable joining technique known in the art may be used, it is preferred to use a transient liquid phase bonding technique. In this technique, a mating surface interlayer 76 may be created using foils 74 that deposit a thin film of interlayer of an alloying metal with a composition close to that of the parent metal along with a melting point depressant. This thin interlayer with the parent blade pieces are bonded and heated simultaneously causing a liquid interlayer. While at temperature, rapid diffusion occurs. The resulting change in interlayer composition causes isothermal solidification of the bond while at temperature. Post bond heat treatment allows for further additional diffusion resulting in a joint ideally equivalent, both microstructurally and chemically, to the parent base metal. The re-melt temperature of the bond line is comparable to the melting point of the base blade material. Effectively, the bond region mechanical properties approach those of the base blade material.

FIGS. 4A and 4B illustrate a turbine engine component 50 such as a high pressure turbine blade. This type of component can be manufactured using any suitable casting technique known in the art provided that the pressure side and the suction side are cast separately so that their internal wall surfaces are exposed. After the pressure side and the suction side are cast, one or more cooling microcircuits 120 and 120', such as that described above and shown in FIG. 2, can be added to each of the internal wall surfaces using the techniques described above. After the cooling microcircuits have been added, the cast structures containing the pressure side and the suction side, as well as any platform structure and any attachment portion, may be joined together using any suitable technique known in the art such as those described above.

FIGS. 4A and 4B illustrate the split lines 26, 70, and 72 which can be used to form various turbine components such as blades. The split lines 26, 70 and 72 are placed where the operating stresses are minimized. The segmentation of the airfoil portion 10 along the line 26 is placed in a region where the stresses across the bonding surfaces are low. Stresses and temperatures become less of a concern below the top of the platform; however, the split lines 70 and 72 are used to accommodate bearing stresses of a fir-tree in the attachment portion. The split line 26 at the trailing edge is done in such a way as to allow for trailing edge microcircuit traditional castings if desired.

As can be seen from the foregoing discussion, the technology employed in the present invention provides a simple means to implement microcircuit features in an airfoil design without the complexity associated with double-wall cooling designs. The present invention facilitates internal inspection, resolves the plugging problems, and improves performance by eliminating numerous leakage paths.

The method described herein also allows advanced, intricate, and complex cooling microcircuits to be made easier, with good accessibility, good inspectability, thus improving casting yields. Still another advantage is the ability to drill cooling holes from the inside, using datum systems for hole drilling located inside the airfoil; thus improving manufacturability. Casting split lines may create leading edge trenches. Leading and trailing edge portions can be made of ceramic material to be incorporated in conjunction with casting split line concepts to further reduce cooling flows.

It is apparent that there has been provided in accordance with the present invention a manufacturable and inspectable microcircuit cooling for blades which fully satisfies the objects, means, and advantages set forth hereinbefore. While the present invention has been described in the context of specific embodiments, other alternatives, modifications, and variations will become apparent to those skilled in the art having read the foregoing description. Accordingly, it is intended to embrace those alternatives, modifications, and variations which fall within the broad scope of the appended claims.

What is claimed is:

1. A method for manufacturing a turbine engine component comprising the steps of:
    forming a first half of an airfoil portion of the turbine engine component;
    forming a plurality of cooling microcircuits having at least one passageway on an exposed internal wall surface of said first half of said airfoil portion; and
    said cooling microcircuit forming step comprising forming each said cooling microcircuit by forming a plurality of elements from a metal matrix composite.

2. The method according to claim 1, wherein said first half is formed by casting.

3. A method for manufacturing a turbine engine component comprising the steps of:
    forming a first half of an airfoil portion of the turbine engine component;
    forming a plurality of cooling microcircuits having at least one passageway on an exposed internal wall surface of said first half of said airfoil portion; and
    placing a respective cover plate over each said cooling microcircuit.

4. The method according to claim 3, wherein said cooling microcircuits forming step comprises forming each said cooling microcircuit by casting a plurality of elements forming said at least one passageway.

5. The method according to claim 3, wherein said cooling microcircuits forming step comprises forming each said cooling microcircuit by machining a plurality of elements forming said at least one passageway.

6. The method according to claim 3, wherein said cooling microcircuits forming step comprises forming each said first cooling microcircuit with an inlet and an outlet.

7. The method according to claim 3, further comprising joining said respective cover plate to said cooling microcircuit using a brazing technique.

8. The method according to claim 3, further comprising joining said respective cover plate to said cooling microcircuit using a solid state diffusion bonding technique.

9. The method according to claim 3, further comprising:
    forming a second half of said airfoil portion of said turbine engine component; and
    forming at least one additional cooling microcircuit having at least one passageway on an exposed internal wall surface of said second half of said airfoil portion.

10. The method according to claim 9, wherein said second half is formed by casting.

11. The method according to claim 9, wherein said at least one additional cooling microcircuit forming step comprises forming said at least one additional cooling microcircuit by casting a plurality of elements forming said at least one passageway.

12. The method according to claim 9, wherein said at least one additional cooling microcircuit forming step comprises forming said at least one additional cooling microcircuit by machining a plurality of elements forming said at least one passageway.

13. The method according to claim 9, wherein said at least one additional cooling microcircuit forming step comprises forming said at least one additional cooling microcircuit by forming a plurality of elements from a metal matrix composite.

14. The method according to claim 9, wherein said at least one additional cooling microcircuit forming step comprises forming a plurality of additional cooling microcircuits.

15. The method according to claim 9, wherein said at least one additional cooling microcircuit forming step comprises forming each said additional cooling microcircuit with an inlet and an outlet.

16. The method according to claim 9, further comprising placing a respective cover plate over each said additional cooling microcircuit.

17. The method according to claim 16, further comprising joining each said respective cover plate to each said additional cooling microcircuit using a brazing technique.

18. The method according to claim 16, further comprising joining each said respective cover plate to each said additional cooling microcircuit using a solid state bonding technique.

19. The method according to claim 3, further comprising placing said first half of said airfoil portion in an abutting relationship with respect to a second half of said airfoil portion and joining said first half to said second half using a transient liquid phase bonding technique.

20. The method according to claim 19, further comprising inspecting each of said microcircuits prior to said placement of said first half in said abutting relationship with said second half.

21. The method according to claim 9, further comprising:
    said first half forming step comprising forming said first half with a first platform portion and a first fillet structure between an exterior surface of said first half of said airfoil portion and a surface of said first platform portion; and
    said second half forming step comprising forming said second half with a second platform portion and a second fillet structure between an exterior surface of said second half of said airfoil portion and a surface of said second platform portion.

22. A turbine engine component comprising:
    an airfoil portion formed by a first airfoil half in an abutting relationship with a second airfoil half;
    said first airfoil half having an internal wall surface and a plurality of cooling microcircuits formed on said internal wall surface;
    said second airfoil half having an internal wall and at least one additional cooling microcircuit formed on said internal wall surface of said second airfoil half; and
    a first cast platform portion joined to said first airfoil half and a second cast platform portion joined to said second airfoil half.

23. The turbine engine component according to claim 22, wherein said first airfoil half and said second airfoil half are separately cast structures.

24. A turbine engine component comprising:
    an airfoil portion formed by a first airfoil half in an abutting relationship with a second airfoil half;
    said first airfoil half having an internal wall surface and a plurality of cooling microcircuits formed on said internal wall surface;

said second airfoil half having an internal wall and at least one additional cooling microcircuit formed on said internal wall surface of said second airfoil half;

a cover plate placed over each said microcircuit; and each said cover plate being bonded to internal features of a respective cooling microcircuit.

25. The turbine engine component according to claim 22, further comprising a first cast attachment portion joined to said first cast platform portion and a second cast attachment portion joined to said second cast platform portion.

26. The turbine engine component according to claim 25, further comprising said first airfoil half, first platform portion, and said first attachment portion joined to said second airfoil half, said second platform portion, and said second attachment portion using transient liquid bonding.

27. The turbine engine component of claim 22, wherein said turbine engine component is a turbine blade.

28. The turbine engine component of claim 22, further comprising a plurality of additional cooling microcircuits formed on said internal wall of said second airfoil half.

* * * * *